United States Patent [19]
Jackson et al.

[11] Patent Number: 5,291,498
[45] Date of Patent: Mar. 1, 1994

[54] ERROR DETECTING METHOD AND APPARATUS FOR COMPUTER MEMORY HAVING MULTI-BIT OUTPUT MEMORY CIRCUITS

[75] Inventors: James A. Jackson, Richardson; Marc A. Quattromani, Allen; Kevin M. Lowderman, Richardson, all of Tex.

[73] Assignee: Convex Computer Corporation, Richardson, Tex.

[21] Appl. No.: 647,408

[22] Filed: Jan. 29, 1991

[51] Int. Cl.⁵ ............................................. H03M 13/00
[52] U.S. Cl. .................. 371/40.1; 371/37.2; 371/40.2
[58] Field of Search ............... 371/40.1, 40.4, 37.5, 371/37.6, 37.7; 364/265, 265.1, 265.3, 266.3, 266.4, 943.9

[56] References Cited

U.S. PATENT DOCUMENTS

| | | | |
|---|---|---|---|
| 3,685,014 | 8/1972 | Hsiao et al. | 371/37.2 |
| 4,030,067 | 6/1977 | Howell et al. | 340/146.1 |
| 4,077,028 | 2/1978 | Lui et al. | 371/40.1 |
| 4,168,486 | 9/1979 | Legory | 340/146.1 |
| 4,209,846 | 6/1980 | Seppa | 364/900 |
| 4,618,955 | 10/1986 | Sharpe et al. | 371/37 |
| 4,713,816 | 12/1987 | Van Gils | 371/38 |
| 4,775,978 | 10/1988 | Hartness | 371/40.1 |
| 4,805,173 | 2/1989 | Hillis et al. | 371/40.1 |
| 5,056,095 | 10/1991 | Horiguchi et al. | 371/40.1 |
| 5,117,428 | 5/1992 | Jeppesen, III et al. | 371/40.4 |

FOREIGN PATENT DOCUMENTS 0166269 2/1986 European Pat. Off. .
0401994 12/1990 European Pat. Off. .

OTHER PUBLICATIONS

G. A. Buskirk of IBM for Johnson Space Center, "32-Bit-Wide Memory Tolerates Failures", NTIS Tech Notes, Oct. 1990, Springfield, Va., p. 818.

"A Scarce-State-Transition Viterbi-Decoder VLSI for Bit Error Correction", T. Ishitani, K. Tansho, N. Miyahara, S. Kubota & S. Kato, IEEE Journal of Solid-State Circuits, vol. SC-22, No. 4, Aug. 1987, pp. 575–582.

"An Error-Control Coding System for Storage of 16--Bit Words in Memory Arrays Composed of Three 9-Bit Wide Units", W. J. Van Gils, Philips Journal of Research, vol. 41, No. 4, 1986, pp. 391-399.

"A New Model of Neural Networks for Error Correction", Dzung-ji-lii & Yoshiyasu Takefuji, IEEE/Ninth Annual Conference of the Engineering in Medicine and Biology Society, 1987.

"Design and Application of a 20K Gate Array", H. P. Holzapfel, K. Horninger and P. Michel, IEEE Transactions on Industrial Electronics, vol. IE-33, No. 4, Nov. 1986, pp. 388-393.

(List continued on next page.)

*Primary Examiner*—Robert W. Beausoliel, Jr.
*Assistant Examiner*—Trinh Tu
*Attorney, Agent, or Firm*—Winstead Sechrest & Minick

[57] ABSTRACT

An error correcting code and apparatus are used in conjunction with a main memory in which a data word is stored in a plurality of circuits each of which produces multiple outputs. A minimum number of check bits are stored together with the data word for detecting and correcting single bit errors and detecting the existence of multi-bit errors. A parity bit for the entire data word is also stored. For a 32-bit data word, at least 3 bits of the data word are stored in each of 10 memory circuits. Seven check bits and one parity bit are also stored in the 10 memory circuits wherein no more than one of the check bits or parity bit is stored in any one memory circuit. Upon reading the data word from the memory a set of verify check bits and a verify parity bit are generated and compared to the stored check bits and stored parity bit to produce a check bit syndrome and a parity bit syndrome. The check bit syndrome is decoded to produce an output that is input to an error generator circuit together with a parity syndrome for producing error signals indicating occurrence of a single bit error, a multi-bit error, a triple bit error, or a check bit error.

10 Claims, 4 Drawing Sheets

OTHER PUBLICATIONS

"A Software Technique for Diagnosing and Correcting Memory Errors", J. Liss, IEEE Transactions on Reliability, vol. R-35, No. 1, 1986 Apr. 1986.

"Memory Error Correction Technique", IBM Technical Disclosure Bulletin, vol. 28, No. 2, Jul. 1985, pp. 792-793.

"Reliability and Serviceability Enhancement for Multi-Bit Array Chip Storage", IBM Technical Disclosure Bulletin, vol. 28, No. 8, Jan. 1986, pp. 3461-3462.

"Multiple-Bit Fault Tolerant Read Only Memory", Department of Electrical and Computer Engineering, Univ. of Cincinnati, 1985 IEEE, pp. 188-191.

"On Combined Symbol-and-Bit Error-Control [4,2] Codes over $[0,1]^8$ to be Used in the (4,2) Concept Fault-Tolerant Computer", Wil J. van Gils & Jean-Paul Boly, IEEE Transactions on Information Theory, vol. IT-33, No. 6, Nov. 1987, pp. 911-917.

```
SYNDROME<6:0>=0B0000011
SYNDROME<6:0>=0B0000101
SYNDROME<6:0>=0B0000110
SYNDROME<6:0>=0B0001001
SYNDROME<6:0>=0B0001010
SYNDROME<6:0>=0B0001100
SYNDROME<6:0>=0B0001111
SYNDROME<6:0>=0B0010001
SYNDROME<6:0>=0B0010010
SYNDROME<6:0>=0B0010100
SYNDROME<6:0>=0B0010111
SYNDROME<6:0>=0B0011000
SYNDROME<6:0>=0B0011011
SYNDROME<6:0>=0B0011101
SYNDROME<6:0>=0B0011110
SYNDROME<6:0>=0B0100001
SYNDROME<6:0>=0B0100010
SYNDROME<6:0>=0B0100100
SYNDROME<6:0>=0B0100111
SYNDROME<6:0>=0B0101000
SYNDROME<6:0>=0B0101011
SYNDROME<6:0>=0B0101101
SYNDROME<6:0>=0B0101110
SYNDROME<6:0>=0B0110000
SYNDROME<6:0>=0B0110011
SYNDROME<6:0>=0B0110101
SYNDROME<6:0>=0B0110110
SYNDROME<6:0>=0B0111001
SYNDROME<6:0>=0B0111010
SYNDROME<6:0>=0B0111100
SYNDROME<6:0>=0B0111111
SYNDROME<6:0>=0B1000001
SYNDROME<6:0>=0B1000010
SYNDROME<6:0>=0B1000100
SYNDROME<6:0>=0B1000111
SYNDROME<6:0>=0B1001000
SYNDROME<6:0>=0B1001011
SYNDROME<6:0>=0B1001101
SYNDROME<6:0>=0B1001110
SYNDROME<6:0>=0B1010000
SYNDROME<6:0>=0B1010011
SYNDROME<6:0>=0B1010101
SYNDROME<6:0>=0B1010110
SYNDROME<6:0>=0B1011001
SYNDROME<6:0>=0B1011010
SYNDROME<6:0>=0B1011100
SYNDROME<6:0>=0B1011111
SYNDROME<6:0>=0B1100000
SYNDROME<6:0>=0B1100011
SYNDROME<6:0>=0B1100101
SYNDROME<6:0>=0B1100110
SYNDROME<6:0>=0B1101001
SYNDROME<6:0>=0B1101010
SYNDROME<6:0>=0B1101100
SYNDROME<6:0>=0B1101111
SYNDROME<6:0>=0B1110001
SYNDROME<6:0>=0B1110010
SYNDROME<6:0>=0B1110100
SYNDROME<6:0>=0B1110111
SYNDROME<6:0>=0B1111000
SYNDROME<6:0>=0B1111011
SYNDROME<6:0>=0B1111101
SYNDROME<6:0>=0B1111110
```

ERROR DETECTING METHOD AND APPARATUS FOR COMPUTER MEMORY HAVING MULTI-BIT OUTPUT MEMORY CIRCUITS

TECHNICAL DESCRIPTION

The present invention pertains in general to error correction and detection and in particular to the application of error correction and detection codes to computer memories which utilize memory circuits having multi-bit outputs.

BACKGROUND OF THE INVENTION

Computer memories typically utilize dynamic random access memories (DRAMs) for the storage of data that is used in the CPU of the computer. This data is subject to corruption due to many possible causes. As a result, memory systems have been refined and developed so that the occurrence of random errors is relatively infrequent. But, in many applications the integrity of the data is so critical that even relatively infrequent errors cannot be tolerated. Various error correction and detection codes have been developed to detect, and in certain situations, correct such errors. The most well known is the Hamming Code, which typically provides detection for one or two-bit errors and correction of one-bit errors. Commercial circuits are available which can implement such a Hamming code in computer memory systems. The technology of the Hamming Code is well known and is widely described in the literature in this field of technology.

The use of the Hamming code is quite effective in conventional memory systems in which one bit of data is stored in each memory device. Large memory systems typically include hundreds, or even thousands of individual memory devices, each of which may contain, for example, 1 megabit, 4 megabits or 16 megabits of data. DRAM devices have conventionally had a one-bit output per device such that a data word is distributed across the same number of memory devices as the number of bits in the word. Randomly occurring errors, generally referred to as soft errors, are most frequently one-bit errors. Further, if a particular memory device were to fail, either permanently or transiently, there would still be produced a one-bit error in the resulting data word. Therefore, by use of a Hamming Code a one-bit error can be detected and corrected. It has been assumed that the probability of multi-bit errors under these circumstances is remote. A Hamming Code can typically detect, but not correct, a two-bit error. However, it is very difficult to economically detect and correct a greater number of bit errors. It has heretofore been the accepted position that the probability of occurrence of multi-bit errors is so remote that it could be safely ignored.

With the introduction of much larger main memory capacities, such as several hundred megabytes for a single computer main memory, it has become necessary to utilize memory circuits which output multiple bits from each device, rather than only a single bit. Typical DRAM memory devices of this type can provide a four-bit output in parallel for memory device sizes such as one and four megabits. It is anticipated that such practice will continue, and possibly have even greater multi-bit outputs when memory circuits go up in capacity to 16 and 64 megabits. But, when a single memory device produces four bits in a single data word, there is a much greater likelihood of having a multi-bit error should there be a failure of that particular memory device.

Certain applications of computer systems have been developed which require an extremely high level of data integrity. The existence of undetected errors, even at the rate of only one or two per year, for such a computer system could result in serious consequences. In view of the greater likelihood of encountering multi-bit errors due to the use of multi-bit output memory devices and the increased criticality of data integrity, there exists a need for a method and apparatus to detect the occurrence of multi-bit errors for data which is stored in such a computer memory.

SUMMARY OF THE INVENTION

A selected embodiment of the present invention is a method of error correction and detection for data which is stored in a computer memory. A minimum number of error detection and correction store check bits is generated for a data word by use of a selected error correction code. This code detects and corrects single bit errors and detects multiple bit errors in the data word. A parity store check bit is generated for the entirety of the data word. The data word, the store check bits and the store parity check bit are stored in the computer memory. The computer memory comprises a plurality of multi-bit output memory devices wherein multiple bits of the data word are stored in each of the memory devices. No more than one of the store check bits or store parity check bit is stored in any one of the memory devices. The memory is read to produce the data word, the store check bits and the store parity bit. Due to error conditions there may be one or more bit errors in the collection of the data word, the store check bits and the store parity check bit which were read from the computer memory. The selected error correction code is applied to the data word, which was read from the computer memory, to generate a set of verify check bits. A verify parity check bit is generated by examination of the data word read from the computer memory. The store check bits read from the computer memory are compared to the verify check bits to produce a check bit syndrome. The store parity check bit read from the computer memory is also compared to the verify parity check bit to produce a parity syndrome. Next, the check bit syndrome is decoded to:

(a) either detect and identify single bit errors or detect triple bit errors which all occur within the data bits and check bits stored within one of said memory devices, wherein a first output is produced upon such an occurrence, or (b) detect double bit errors, wherein a second output is produced upon such an occurrence, or (c) detect triple bit errors which all occur within the data bits within one of the memory devices and produce a third output under such circumstances, and comparing the first output, if such a first output is produced, to the parity syndrome to produce either a fourth output which indicates a single bit error or a fifth output which indicates the existence of a triple bit error within one of the memory circuits.

A further aspect of the present invention comprises a method for the specific storage of data bits for a 32-bit data word and corresponding check bits of the data word in a computer memory which utilizes a plurality of multi-bit output memory devices. The method includes storing four bits of the data word in a first 4-bit output memory device, storing 4 bits of the data word in a second 4-bit output memory device, storing 3 bits of the data word and one error correction and detection check bit in a third 4-bit output memory device, storing 3 bits of the data word and one error correction and detection check bit in a fourth 4-bit output memory device, storing 3 bits of the data word and one error correction and detection check bit in a fifth 4-bit output memory device, storing 3 bits of the data word and one error correction and detection check bit in a sixth 4-bit output memory device, storing 3 bits of the data word and one error correction and detection check bit in a seventh 4-bit output memory device, storing 3 bits of the data word and one error correction and detection check bit in a eighth 4-bit output memory device, storing 3 bits of the data word and one error correction and detection check bit in a ninth 4-bit output memory device, and storing 3 bits of the data word and a parity bit for the data word in a tenth 4-bit output memory device.

BRIEF DESCRIPTION OF THE DRAWINGS

For more complete understanding of the present invention and the advantages thereof, reference is now made to the following description taken in conjunction with the accompanying drawings in which:

FIGS. 3A and 3B are a detailed circuit diagram for the error generator circuit shown in FIG. 2.

DETAILED DESCRIPTION

The present invention, for the embodiment described herein, includes an 8-bit error detection and correction (EDC) code for use in conjunction with a memory system in which multiple bits of a data word are stored in individual memory devices. The most common form of memory device now in use is a dynamic random access memory (DRAM). The configuration of current DRAMs, which are applicable to the memory system described herein, is designated as 256K by 4 or 1 megabit by 4. This designation means that upon occurrence of a memory read or write cycle, 4 bits of data are written or read in parallel during one cycle. It is becoming more common, particularly in large main memories, to utilize such multi-bit output memory devices. A typical data word may comprise 32 bits, which are distributed across multiple memory devices. When error correcting and detection check bits are used in conjunction with the data word, they also are stored in the main memory.

For a 32-bit data word, a Hamming Code uses a minimum of 7 bits which can detect and correct a single bit error and detect the existence of a double bit error.

A standard 7-bit Hamming Code can be implemented by the use of commercially available parts such as the AMD Am2nC660, National Semiconductor 74F632, or Texas Instruments SN74AS632. For the present invention, the detection and correction of single bit errors and the detection of double bit errors are carried out in the same method as implemented in these commercially available parts.

In addition to the Figures which are utilized herein to describe the present invention, there are further included four tables which follow the Detailed Description. These four tables will be referenced in the description of the invention herein.

Figure 1:
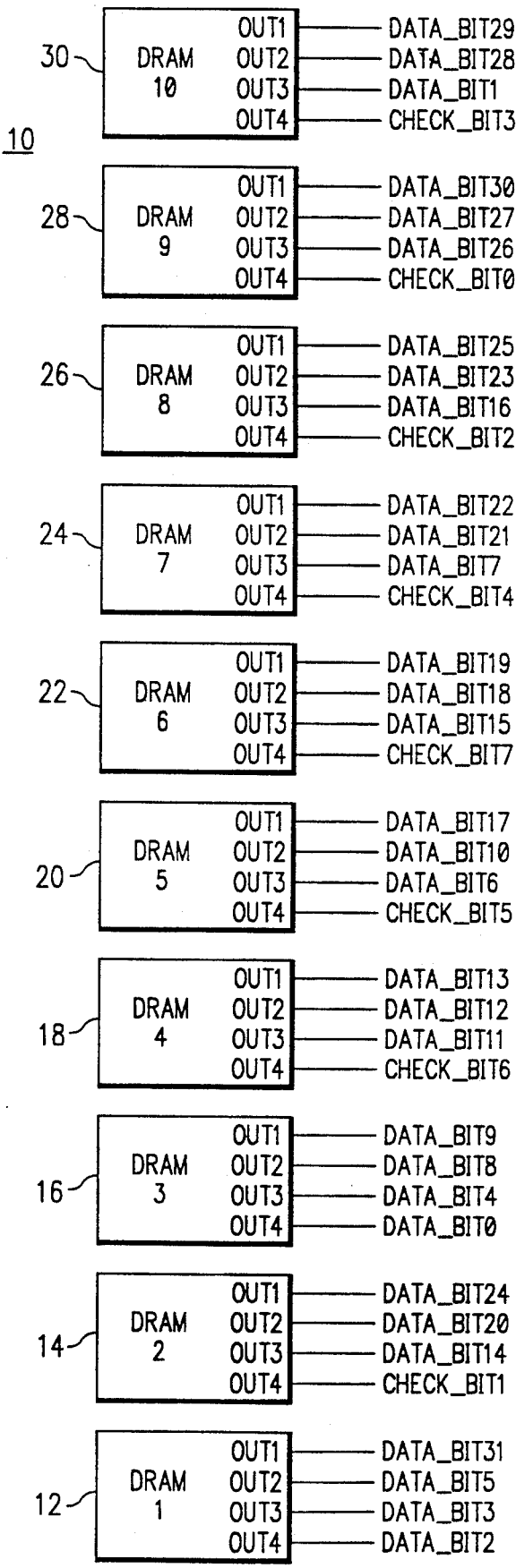
FIG. 1 is an illustration of a computer memory which comprises a collection of dynamic random access memory (DRAM) devices which store a plurality of bits for a single data word together with error correction and detection check bits.

A segment of a main memory, as utilized in the present invention, is shown in FIG. 1. A memory 10, which is a small part of a much larger overall main memory, comprises ten dynamic random access memory devices 12, 14, 16, 18 20, 22, 24, 26, 28 and 30. Each of these memory devices produces a 4-bit output during a memory cycle. Representative memory devices may have a configuration of 256K by 4 bits or 1 megabit by 4 bits. Memory devices of this type are widely available and are described in detail in the literature of the industry. Multi-bit memory devices of greater capacity will undoubtedly become available in the near future.

The memory 10 consists of ten memory devices which are utilized to store one data word. An overall main memory of a computer would utilize a large number of the memories 10 therein. However, the present invention can be fully described by reference only to the memory 10.

An important aspect of the present invention is the storage locations for the data bits for the data word and the associated error correction check bits and parity bit in the memory 10. Each of the memory devices 12–30 includes at least 3 data bits, and no more than 1 check bit is stored in any one of the memory devices.

In accordance with a selected embodiment of the present invention, memory device 12 stores data bits 2, 3, 5 and 31. Memory device 14 stores data bits 14, 20 and 24 together with check bit 1. Memory device 16 stores data bits 0, 4, 8 and 9. Memory device 18 stores data bits 11, 12 and 13 together with check bit 6. Memory device 20 stores data bits 6, 10 and 17 together with check bit 5. Memory device 22 stores data bits 15, 18 and 19 together with check bit 7. Memory device 24 stores data bits 7, 21 and 22 together with check bit 4. Memory device 26 stores data bits 16, 23, and 25 together with check bit 2. Memory device 28 stores data bits 26, 27 and 30 together with check bit 0. And last, memory device 30 stores data bits 1, 28 and 29 together with check bit 3. The check bits 0 through 6 comprise the 7 bits of a conventional 7-bit Hamming code as utilized in the described commercial parts noted above. The eighth check bit is a parity check bit which is produced for the entire 32-bits of the data word.

Figure 2:
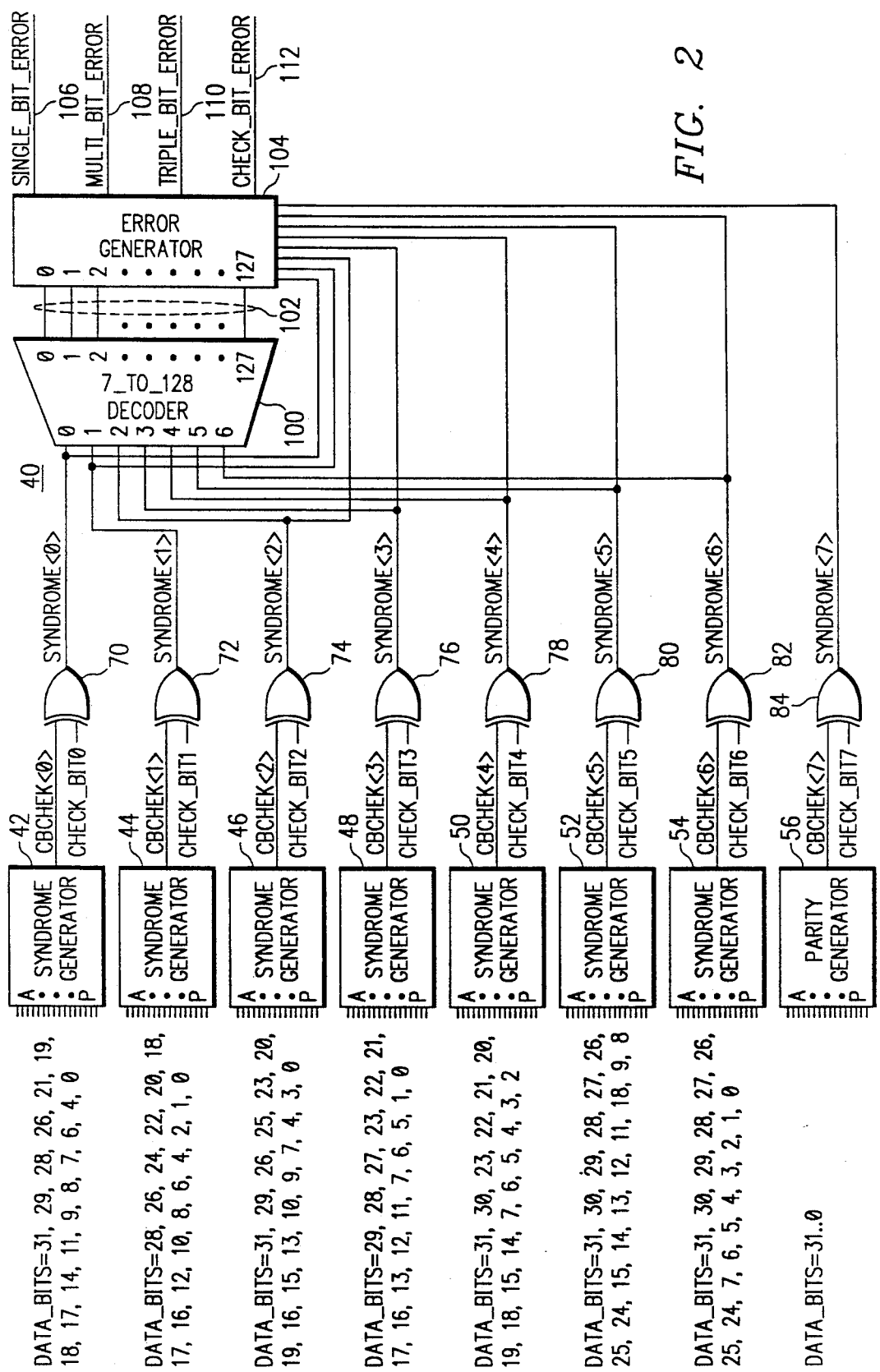
FIG. 2 is a circuit diagram for an error correction and detection circuit in accordance with the present invention for detecting and correcting single bit errors and detecting various types of multi-bit errors.

Referring now to FIG. 2 there is illustrated further apparatus for use in accordance with the present invention. An error control device 40 includes 7 syndrome generator circuits 42, 44, 46, 48, 50, 52 and 54 together with a parity generator circuit 56. Each of the syndrome generator circuits receives 16-bits of the 32-bit data word, and through an exclusive-OR function produces an error correction check bit. The syndrome generator circuits 42–54 respectively produce check bits 0 through 6. The parity generator circuit 56 uses an exclusive-OR function for all 32 bits of the data word to produce a verify check bit.

The data inputs for each of the syndrome generator circuits 42–54 are data words read from the memory 10. These inputs are as follows:

| SYNDROME GENERATOR CIRCUIT | DATA BITS INPUT TO SYNDROME GENERATOR CIRCUIT |
| --- | --- |
| 42 | 0, 4, 6, 7, 8, 9, 11, 14, 17, 18, 19, 21, 26, 28, 29, 31 |
| 44 | 0, 1, 2, 4, 6, 8, 10, 12, 16, 17, 18, 20, 22, 24, 26, 28 |
| 46 | 0, 3, 4, 7, 9, 10, 13, 15, 16, 19, 20, 23, 25, 26, 29, 31 |
| 48 | 0, 1, 5, 6, 7, 11, 12, 13, 16, 17, 21, 22, 23, 27, 28, 29 |
| 50 | 2, 3, 4, 5, 6, 7, 14, 15, 1, 19, 20, 21, 22, 23, 30, 31 |
| 52 | 8, 9, 10, 11, 12, 13, 14, 15, 24, 23, 26, 27, 20, 29, 31 |
| 54 | 0, 1, 2, 3, 4, 5, 6, 7, 24, 25, 26, 27, 28, 29, 30, 31 |

All 32 data bits (0. . . 31) are input to the parity generator circuit 56 to produce a parity bit which is designated as check bit 7.

Each of the syndrome generator circuits 42-56 is an exclusive-OR circuit.

The outputs from the respective circuits 42-56 are provided as first inputs to exclusive-OR logic gates 70, 72, 74, 76, 78, 80, 82 and 84. The check bits 0-7 read from the memory 10 are input respectively to the second inputs of logic gates 70-84. The outputs of the logic gates 70-84 are respective syndrome bits 0-7. The syndrome bits 0-6 are herein designated as a check bit syndrome and the syndrome bit 7 is designated herein as a parity bit syndrome.

The check bit syndrome (bits 0-6) is input to a decoder 100 which decodes the 7 inputs into each of the possible 128 combinations to thereby activate a selected 1 of the 128 outputs from the decoder 100. The decoder 100 is a conventional logic design for such decoding.

The outputs from the decoder 100 are transmitted through a group of lines 102 to a corresponding set of inputs to an error generator circuit 104. The check bit syndrome (bits 0-6) is also input to the error generator circuit 104. The parity bit syndrome, bit 7, produced at the output of gate 84 is likewise provided as an input to the error generator circuit 104. Upon receipt of the inputs to the circuit 104, this circuit produces one of 4 possible outputs at lines 106, 108, 110. 112. An output is generated at the line 106 for a single bit error, at line 108 for a multi-bit error, at line 110 for a triple bit error and at line 112 for a check bit error.

Figure 3B:
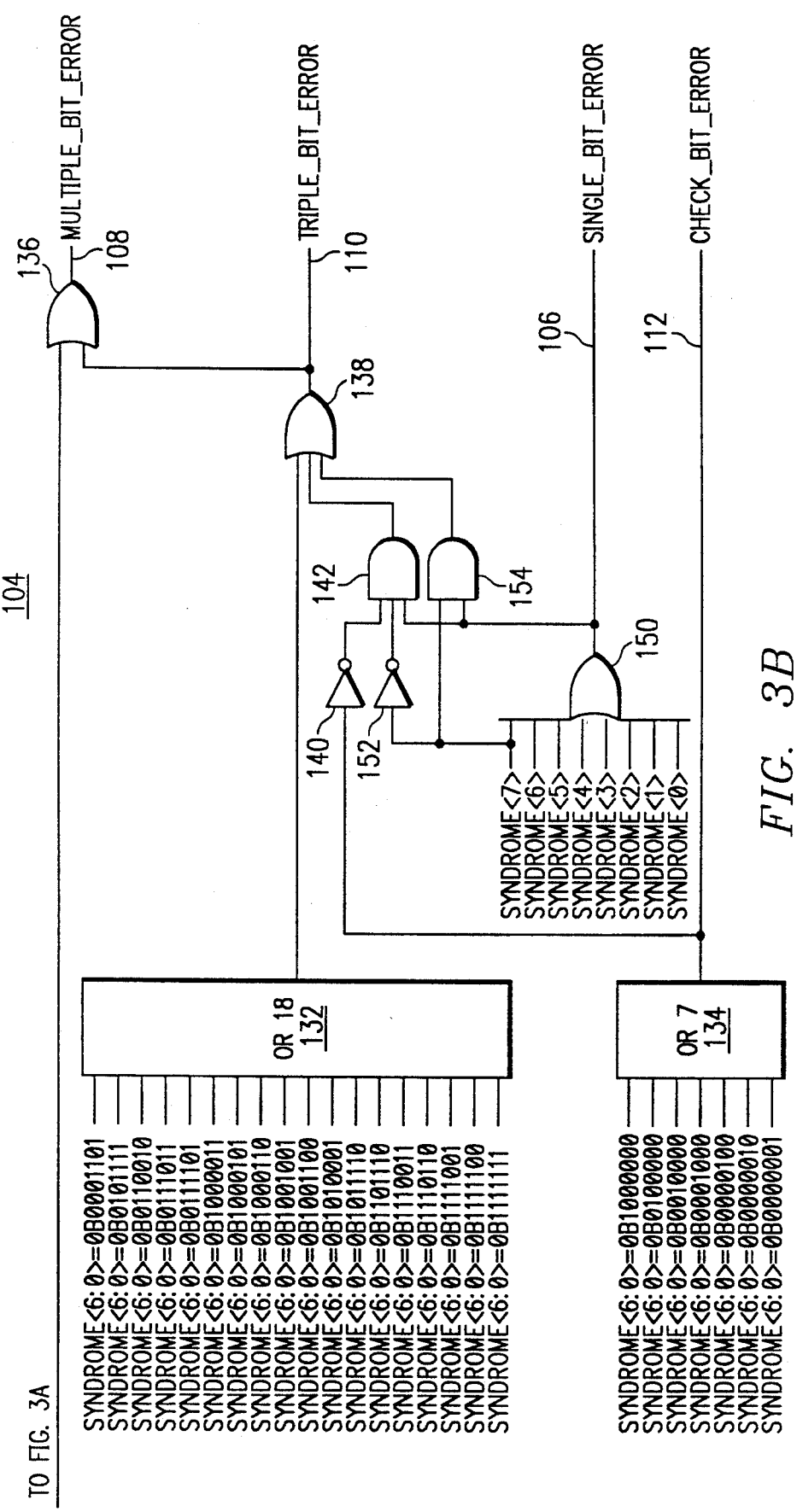

The error generator circuit 104 is described in detail in FIGS. 3A and 3B. The 128 outputs of the circuit 100 in lines 102 are input respectively to an OR circuit 130, an OR circuit 132 and an OR circuit 134. The output from OR circuit 130 is provided as a first input to an OR gate 136 which has line 108 as the output thereof for indicating a multiple bit error.

The output of the OR circuit 132 is provided as a first input to an OR circuit 138 which has the output thereof provided as a second input to the OR circuit 136 and to the line 110 for indicating the existence of triple bit error. The output of the OR circuit 134 is provided to line 112 for indicating a check bit error and is also provided as an input to an inverter 140 which has the output thereof provided to a first input of an AND gate 142. The output AND gate 142 is provided as the second input of the OR gate 138. The syndrome bits 0-7 from the gates 70-84 are input to an OR gate 150 which has the output thereof connected to the third input of the AND gate 142. The syndrome bit 7 is connected through an inverter 152 to the second input of the AND gate 142. This syndrome bit 7 is further connected to the first input of an AND gate 154 which has the output of OR gate 150 connected to the second input thereof. The output of the AND gate 154 is connected to the third input of the OR gate 138.

The inputs to the error generator circuit 104 are the 128 elements of lines 102 together With the 8 syndrome inputs (bits 0-7). The logic shown in FIGS. 3A and 3B produces the error output indications at lines 106, 108, 110 and 112.

The operation of the present invention is now described in reference to FIGS. 1 and 2. When a computer main memory, which includes the memory 10, receives a 32-bit data word, that data word is processed through a syndrome generator, which is equivalent to the syndrome circuits 42-54 to produce a 7-bit Hamming Code in a conventional manner. The 32-bit data word is likewise input to a parity generator circuit, such as the circuit 56, to produce a parity check bit.

The 7 check bits of the Hamming Code together with the parity check bit are then stored in the memory devices 12-30 in the particular organization described in reference to FIG. 1 and shown therein. These are referred to as store check bits and a store parity bit. Therefore, for each data word there are stored 32 bits for the data word, 7 bits for the Hamming Code and 1 bit for the parity check bit. Eight of the memory devices store 3 data bits together with 1 check or parity bit and two of the memory devices store only 4 data bits.

When a request is received to read the particular data word, which has previously been stored in the memory 10, it is read in parallel, together with the check bits and parity bit, as shown for the outputs of the memory devices in FIG. 1. The data words read from the memory 10 are input to the syndrome generator circuits 42-54 in the combinations shown as inputs for these circuits in FIG. 2. All 32 bits of the data word read from the memory 10 are input to the parity generator circuit 56. Each of the syndrome generator circuits 42-54 generates a respective check bit which is termed a verify check bit. The parity generator circuit 56 likewise produces what is termed a verify parity check bit. Each of the verify check bits is input to a respective one of the gates 70-84 together with its corresponding store check bit which was read from the memory 10.

The logic gates 70-82 produce a check bit syndrome which is a function of the store check bits read from the memory 10 and the verify check bits produced by the syndrome generator circuits 42-54. If no errors have occurred in the data words or check bits or in the production of the new verify check bits, then the outputs of the logic gates 70-84 will all be a uniform logic (0). This syndrome state will produce a given logic output on one of the output lines of the decoder 100, which output is provided to the error generator circuit 104. For this condition, the error generator circuit 104 will not activate any one of the lines 106-112 since no error has occurred.

When an error situation has occurred, the inputs to the logic gates 70-84 will not all be the same and a check bit syndrome, indicating the occurrence of an error, will be generated at the output of the logic gates 70-82. This 7-bit syndrome is input to the decoder 100 which generates an active state for one of its 128 outputs that corresponds to the input syndrome. This output is provided to the corresponding input of the error generator circuit 104. Further input to the circuit 104 is the parity syndrome produced by the logic gate 84 and the check bit syndrome (0–6). These inputs are logically compared to produce one of the 4 outputs at lines 106, 108, 110 and 112. The logic for producing the particular output is described below.

The occurrence of a single bit error in the data word is termed a "soft error". The existence of a single bit error can be determined and the location of the bit in error in the data word can likewise be determined. This bit is then inverted to produced a corrected data word. This is a conventional Hamming error detection and correction process. When this occurs, an output signal is generated at line 106 indicating the occurrence of a single bit (soft) error.

However, if a multi-bit error has occurred in the data word and check bits, any one of two other outputs may be generated. If a triple bit error is detected wherein all of the errors occur within one of the memory devices 12-30, an output is generated at line 110. If however, there is a multi-bit error and it cannot be determined that all of the bits in error occurred within one of the memory devices 12-30, an output is generated at line 108 indicating the occurrence of such a multi-bit error.

If an error has occurred in one of the check bits read from the memory 10, an error signal is generated at line 112.

Table 1 illustrates the 8-bit syndrome generated at the output of gates 70-84 for each single bit error condition. The data bits are identified as DB0–DB31 and the check bits are identified as CB0–CB7. For each single bit error there is shown the corresponding syndrome expressed in a hexadecimal value.

Referring to Table 2, there are illustrated the 128 possible syndromes for the 7-bit check bit comprising syndrome bits 0-6. For each syndrome there is shown the corresponding error type. The possible error types are single bit, triple bit, multiple bit and quad bit. The decoder 100 receives the 7 bit syndrome input and activates one of its 128 outputs in response thereto.

Table 3 illustrates the syndromes that are generated by the logic gates 70-84. A syndrome is shown for each of the 3- and 4-bit error conditions which can occur for each of the DRAM memory circuits 12-30. The syndromes are again listed as a hexadecimal value. These represent all 8 bits of the syndrome produced at the outputs of the logic gates 70-84.

Table 4 illustrates each of the logic relationships between the possible syndrome values and the outputs produced at the lines 106, 108, 110 and 112. A single bit error is indicated by the letter "S", double bit error by the letter "D", a triple bit error by the letter "T" and a quad bit error by the letter "Q". The numbers following the letters are the number of error conditions represented by that entry.

The data listings in the Table 1-4 taken in conjunction with the circuits shown in FIGS. 2 and 3 uniquely define the logic within the error generator circuit 104 for producing the selected 4 outputs at lines 106, 108, 110 and 112.

The present invention provides detection of triple bit errors provided that such errors occur within a single one of the memory circuits 12-30. Triple bit which occur across multiple ones of the memory circuits 12-30 are not necessarily detected. However, since such errors will likely be due to the complete failure of one of the memory circuits, it is highly likely that any triple bit error will be detected.

Although several embodiments of the present invention have been illustrated in the accompanying drawings and described in the foregoing detailed description, it will be understood that the invention is not limited to the embodiments disclosed, but is capable of numerous rearrangements, modifications and substitutions without departing from the scope of the invention.

TABLE 1

| Single Bit Error Source | Syndrome (8 bit Hexadecimal value) |
|---|---|
| Data Bit 31 (DB31) | f5 |
| Data Bit 30 (DB30) | f0 |
| Data Bit 29 (DB29) | ed |
| Data Bit 28 (DB28) | eb |
| Data Bit 27 (DB27) | e8 |
| Data Bit 26 (DB26) | e7 |
| Data Bit 25 (DB25) | e4 |
| Data Bit 24 (DB24) | e2 |
| Data Bit 23 (DB23) | 9c |
| Data Bit 22 (DB22) | 9a |
| Data Bit 21 (DB21) | 99 |
| Data Bit 20 (DB20) | 96 |
| Data Bit 19 (DB19) | 95 |
| Data Bit 18 (DB18) | 93 |
| Data Bit 17 (DB17) | 8b |
| Data Bit 16 (DB16) | 8e |
| Data Bit 15 (DB15) | b4 |
| Data Bit 14 (DB14) | b1 |
| Data Bit 13 (DB13) | ac |
| Data Bit 12 (DB12) | aa |
| Data Bit 11 (DB11) | a9 |
| Data Bit 10 (DB10) | a6 |
| Data Bit 9 (DB9) | a5 |
| Data Bit 8 (DB8) | a3 |
| Data Bit 7 (DB7) | dd |
| Data Bit 6 (DB6) | db |
| Data Bit 5 (DB5) | d8 |
| Data Bit 4 (DB4) | d7 |
| Data Bit 3 (DB3) | d4 |
| Data Bit 2 (DB2) | d2 |
| Data Bit 1 (DB1) | ca |
| Data Bit 0 (DB0) | cf |
| Check Bit 0 (CB0) | 01 |
| Check Bit 1 (CB1) | 02 |
| Check Bit 2 (CB2) | 04 |
| Check Bit 3 (CB3) | 08 |
| Check Bit 4 (CB4) | 10 |
| Check Bit 5 (CB5) | 20 |
| Check Bit 6 (CB6) | 40 |
| Check Bit 7 (CB7) | 80 |

TABLE 2

| Syndrome <6:0> | Error Type |
|---|---|
| 1110101 | single_bit_error |
| 1110000 | single_bit_error or triple_bit_error |
| 1101101 | single_bit_error |
| 1101011 | single_bit_error |
| 1101000 | single_bit_error |
| 1100111 | single_bit_error |
| 1100100 | single_bit_error |
| 1100010 | single_bit_error |
| 0011100 | single_bit_error |
| 0011010 | single_bit_error |
| 0011001 | single_bit_error or triple_bit_error |
| 0010110 | single_bit_error or triple_bit_error |
| 0010101 | single_bit_error |
| 0010011 | single_bit_error or triple_bit_error |
| 0001011 | single_bit_error |
| 0001110 | single_bit_error or triple_bit_error |
| 0110100 | single_bit_error |
| 0110001 | single_bit_error |
| 0101100 | single_bit_error |
| 0101010 | single_bit_error |
| 0101001 | single_bit_error or triple_bit_error |
| 0100110 | single_bit_error |
| 0100101 | single_bit_error or triple_bit_error |
| 1011011 | single_bit_error |
| 1011101 | single_bit_error or triple_bit_error |
| 1011011 | single_bit_error |

TABLE 2-continued

| Syndrome <6:0> | Error Type |
|---|---|
| 1011000 | single_bit_error |
| 1010111 | single_bit_error or triple_bit_error |
| 1010100 | single_bit_error or triple_bit_error |
| 1010010 | single_bit_error |
| 1001010 | single_bit_error |
| 1001111 | single_bit_error |
| 1000000 | check_bit error |
| 0100000 | check_bit_error |
| 0010000 | check_bit_error |
| 0001000 | check_bit_error |
| 0000100 | check_bit_error |
| 0000010 | check_bit_error |
| 0000001 | check_bit_error |
| 0000011 | multiple_bit_error |
| 0000101 | multiple_bit_error |
| 0000110 | multiple_bit_error |
| 0001001 | multiple_bit_error |
| 0001010 | multiple_bit_error |
| 0001100 | multiple_bit_error |
| 0001101 | triple_bit_error |
| 0001111 | multiple_bit_error |
| 0010001 | multiple_bit_error |
| 0010010 | multiple_bit_error |
| 0010100 | multiple_bit_error |
| 0010111 | multiple_bit_error |
| 0011000 | multiple_bit_error |
| 0011011 | multiple_bit_error |
| 0011101 | multiple_bit_error |
| 0011110 | multiple_bit_error, quad_error |
| 0100001 | multiple_bit_error |
| 0100010 | multiple_bit_error |
| 0100100 | multiple_bit_error |
| 0100111 | multiple_bit_error |
| 0101000 | multiple_bit_error |
| 0101011 | multiple_bit_error, quad_error |
| 0101101 | multiple_bit_error |
| 0101110 | multiple_bit_error |
| 0101111 | triple_bit_error |
| 0110000 | multiple_bit_error |
| 0110010 | triple_bit_error, quad_error |
| 0110011 | multiple_bit_error |
| 0110101 | multiple_bit_error |
| 0110110 | multiple_bit_error |
| 0111001 | multiple_bit_error |
| 0111010 | multiple_bit_error |
| 0111011 | triple_bit_error |
| 0111100 | multiple_bit_error |
| 0111101 | triple_bit_error |
| 0111111 | multiple_bit_error |
| 1000001 | multiple_bit_error |
| 1000010 | multiple_bit_error |
| 1000011 | triple_bit_error |
| 1000100 | multiple_bit_error, quad_error |
| 1000101 | triple_bit_error |
| 1000110 | triple_bit_error |
| 1000111 | multiple_bit_error, quad_error |
| 1001000 | multiple_bit_error |
| 1001001 | triple_bit_error |
| 1001011 | multiple_bit_error |
| 1001100 | triple_bit_error |
| 1001101 | multiple_bit_error |
| 1001110 | multiple_bit_error, quad_error |
| 1010000 | multiple_bit_error |
| 1010001 | triple_bit_error |
| 1010011 | multiple_bit_error |
| 1010101 | multiple_bit_error |
| 1010110 | multiple_bit_error, quad_error |
| 1011001 | multiple_bit_error |
| 1011010 | multiple_bit_error |
| 1011100 | multiple_bit_error |
| 1011110 | triple_bit_error |
| 1011111 | multiple_bit_error |
| 1100000 | multiple_bit_error |
| 1100011 | multiple_bit_error |
| 1100101 | multiple_bit_error |
| 1100110 | multiple_bit_error |
| 1101001 | multiple_bit_error |
| 1101010 | multiple_bit_error |
| 1101100 | multiple_bit_error |
| 1101110 | triple_bit_error |
| 1110001 | multiple_bit_error, quad_error |
| 1110001 | multiple_bit_error |
| 1110010 | multiple_bit_error, quad_error |
| 1110011 | triple_bit_error |
| 1110100 | multiple_bit_error |
| 1110110 | triple_bit_error |
| 1110111 | multiple_bit_error |
| 1111000 | multiple_bit_error |
| 1111001 | triple_bit_error |
| 1111011 | multiple_bit_error |
| 1111100 | triple_bit_error |
| 1111101 | multiple_bit_error |
| 1111110 | multiple_bit_error, quad_error |
| 1111111 | triple_bit_error |

TABLE 3

| | Syndromes |
|---|---|
| DRAM 0: DB29 DB28 DB1 CB3 | |
| 3 & 4 bit errors | |
| w/in DRAM 0 | |
| DB29, DB28, DB1 | cc |
| DB29, DB28, CB3 | 0e |
| DB29, DB1, CB3 | 2f |
| DB28, DB1, CB3 | 29 |
| DB29, DB28, DB1, CB3 | c4 |
| DRAM 1: DB30 DB27 DB26 CB0 | |
| 3 & 4 bit errors | |
| w/in DRAM 1 | |
| DB30, DB27, DB26 | ff |
| DB30, DB27, CB0 | 19 |
| DB30, DB26, CB0 | 16 |
| DB27, DB26, CB0 | 0e |
| DB30, DB27, DB26, CB0 | fe |
| DRAM 2: DB25 DB23 DB16 CB2 | |
| 3 & 4 bit errors | |
| w/in DRAM 2 | |
| DB25, DB23, DB16 | f6 |
| DB25, DB23, CB2 | 7c |
| DB25, DB16, CB2 | 6e |
| DB23, DB16, CB2 | 16 |
| DB25, DB23, DB16, CB2 | f2 |
| DRAM 3: DB22 DB21 DB7 CB4 | |
| 3 & 4 bit errors | |
| w/in DRAM 3 | |
| DB22, DB21, DB7 | de |
| DB22, DB21, CB4 | 13 |
| DB22, DB7, CB4 | 57 |
| DB21, DB7, CB4 | 54 |
| DB22, DB21, DB7, CB4 | ce |
| DRAM 4: DB19 DB18 DB15 CB7 | |
| 3 & 4 bit errors | |
| w/in DRAM 4 | |
| DB19, DB18, DB15 | b2 |
| DB19, DB18, CB7 | 86 |
| DB19, DB15, CB7 | a1 |
| DB18, DB15, CB7 | a7 |
| DB19, DB18, DB15, CB7 | 32 |
| DRAM 5: DB17 DB10 DB6 CB5 | |
| 3 & 4 bit errors | |
| w/in DRAM 5 | |
| DB17, DB10, DB6. | f6 |
| DB17, DB10, CB5 | 0d |
| DB17, DB6, CB5 | 70 |
| DB10, DB6, CB5 | 5d |
| DB17, DB10, DB6, CB5 | d6 |
| DRAM 6: DB13 DB12 DB11 CB6 | |
| 3 & 4 bit errors | |
| w/in DRAM 6 | |
| DB13, DB12, DB11 | af |
| DB13, DB12, CB6 | 46 |
| DB13; DB11, CB6 | 45 |
| DB12, DB11, CB6 | 43 |
| DB13, DB12, DB11, CB6 | ef |
| DRAM 7: DB9 DB8 DB4 DB0 | |
| 3 & 4 bit errors | |
| w/in DRAM 7 | |
| DB9, DB8, DB4 | d1 |
| D89, DB8, DB0 | c9 |
| DB9, DB4, DB0 | bd |

TABLE 3-continued

| | | Syndromes |
|---|---|---|
| | DB8, DB4, DB0 | bb |
| | DB9, DB8, DB4, DB0 | 1e |
| DRAM 8: DB24 DB20 DB14 CB1 | | |
| 3 & 4 bit errors | | |
| w/in DRAM 8 | | |
| | DB24, DB20, DB14 | c5 |
| | D824, DB20, CB1 | 76 |
| | DB24, DB14, CB1 | 51 |
| | DB20, DB14, CB1 | 25 |
| | DB24, DB20, DB14, CB1 | c7 |
| DRAM 9: DB31 DB5 DB3 DB2 | | |
| 3 & 4 bit errors | | |
| w/in DRAM 9 | | |
| | DB31, DB5, DB3 | f9 |
| | DB31, DB5, DB2 | ff |
| | DB31, DB3, DB2 | f3 |
| | DB5, DB3, DB2 | de |
| | DB31, DB5, DB3, DB2 | 2b |

TABLE 4

S- Single bit error
D- Double bit error
T- Triple bit error
Q- Quad bit error
Syndrome <7:0>

| | | | | |
|---|---|---|---|---|
| 01: | S = 1 | | | |
| 02: | S = 1 | | | |
| 03: | | D = 9 | | |
| 04: | S = 1 | | | |
| 05: | | D = 13 | | |
| 06: | | D = 9 | | |
| 08: | S = 1 | | | |
| 09: | | D = 9 | | |
| 0a: | | D = 9 | | |
| 0b: | | D = 1 | | |
| 0c: | | D = 9 | | |
| 0d: | | | T = 1 | |
| 0e: | | D = 1 | T = 2 | |
| 0f: | | D = 12 | | |
| 10: | S = 1 | | | |
| 12: | | D = 9 | | |
| 13: | | D = 1 | T = 1 | |
| 14: | | D = 5 | | |
| 15: | | D = 1 | | |
| 16: | | D = 1 | T = 2 | |
| 17: | | D = 8 | | |
| 18: | | D = 9 | | |
| 19: | | D = 1 | T = 1 | |
| 1a: | | D = 1 | | |
| 1b: | | D = 4 | | |
| 1c: | | D = 1 | | |
| 1d: | | D = 8 | | |
| 1e: | | D = 4 | | Q = 1 |
| 20: | S = 1 | | | |
| 21: | | D = 5 | | |
| 22: | | D = 9 | | |
| 23: | | D = 1 | | |
| 24: | | D = 5 | | |
| 25: | | D = 1 | T = 1 | |
| 26: | | D = 1 | | |
| 27: | | D = 8 | | |
| 28: | | D = 9 | | |
| 29: | | D = 1 | T = 1 | |
| 2a: | | D = 1 | | |
| 2b: | | D = 4 | | Q = 1 |
| 2c: | | D = 1 | | |
| 2d: | | D = 8 | | |
| 2e: | | D = 4 | | |
| 2f: | | | T = 1 | |
| 30: | | D = 13 | | |
| 31: | | D = 1 | | |
| 32: | | | | Q = 1 |
| 33: | | D = 8 | | |
| 34: | | D = 1 | | |
| 35: | | D = 8 | | |
| 36: | | D = 8 | | |
| 39: | | D = 8 | | |
| 3a: | | D = 12 | | |

TABLE 4-continued

S- Single bit error
D- Double bit error
T- Triple bit error
Q- Quad bit error
Syndrome <7:0>

| | | | | |
|---|---|---|---|---|
| 3c: | | D = 8 | | |
| 3f: | | D = 16 | | |
| 40: | S = 1 | | | |
| 41: | | D = 17 | | |
| 42: | | D = 9 | | |
| 43: | | | T = 1 | |
| 44: | | D = 13 | | |
| 45: | | | T = 1 | |
| 46: | | | T = 1 | |
| 47: | | D = 8 | | |
| 48: | | D = 9 | | |
| 4a: | | D = 1 | | |
| 4b: | | D = 8 | | |
| 4d: | | D = 8 | | |
| 4e: | | D = 12 | | |
| 4f: | | D = 1 | | |
| 50: | | D = 5 | | |
| 51: | | | T = 1 | |
| 52: | | D = 1 | | |
| 53: | | D = 8 | | |
| 54: | | D = 1 | T = 1 | |
| 55: | | D = 4 | | |
| 56: | | D = 8 | | |
| 57: | | D = 1 | T = 1 | |
| 58: | | D = 1 | | |
| 59: | | D = 8 | | |
| 5a: | | D = 4 | | |
| 5b: | | D = 1 | | |
| 5c: | | D = 8 | | |
| 5d: | | D = 1 | T = 1 | |
| 5f: | | D = 4 | | |
| 60: | | D = 5 | | |
| 62: | | D = 1 | | |
| 63: | | D = 8 | | |
| 64: | | D = 1 | | |
| 65: | | D = 4 | | |
| 66: | | D = 8 | | |
| 67: | | D = 1 | | |
| 68: | | D = 1 | | |
| 69: | | D = 8 | | |
| 6a: | | D = 4 | | |
| 6b: | | D = 1 | | |
| 6c: | | D = 8 | | |
| 6d: | | D = 1 | | |
| 6e: | | | T = 1 | |
| 6f | | D = 4 | | |
| 70: | | D = 1 | T = 1 | |
| 71: | | D = 12 | | |
| 72: | | D = 8 | | |
| 74: | | D = 8 | | |
| 75: | | D = 1 | | |
| 76: | | | T = 1 | |
| 77: | | D = 8 | | |
| 78: | | D = 8 | | |
| 7b: | | D = 12 | | |
| 7c: | | | T = 1 | |
| 7d: | | D = 8 | | |
| 7e: | | D = 16 | | |
| 80: | S = 1 | | | |
| 81: | | D = 1 | | |
| 82: | | D = 1 | | |
| 83: | | D = 3 | | |
| 84: | | D = 1 | | |
| 85: | | D = 2 | | |
| 86: | | D = 3 | T = 1 | |
| 88: | | D = 1 | | |
| 89: | | D = 3 | | |
| 8a: | | D = 5 | | |
| 8b: | S = 1 | | | |
| 8c: | | D = 3 | | |
| 8e: | S = 1 | | | |
| 8f: | | D = 3 | | |
| 90: | | D = 1 | | |
| 91: | | D = 4 | | |
| 92: | | D = 4 | | |
| 93: | S = 1 | | | |
| 94: | | D = 5 | | |

TABLE 4-continued

S- Single bit error
D- Double bit error
T- Triple bit error
Q- Quad bit error
Syndrome <7:0>

| | | | | |
|---|---|---|---|---|
| 95: | S = 1 | | | |
| 96: | S = 1 | | | |
| 97: | | D = 4 | | |
| 98: | | D = 4 | | |
| 99: | S = 1 | | | |
| 9a: | S = 1 | | | |
| 9b: | | D = 5 | | |
| 9c: | S = 1 | | | |
| 9d: | | D = 4 | | |
| 9e: | | D = 4 | | |
| a0: | | D = 1 | | |
| a1: | | D = 4 | T = 1 | |
| a2: | | D = 4 | | |
| a3: | S = 1 | | | |
| a4: | | D = 5 | | |
| a5: | S = 1 | | | |
| a6: | S = 1 | | | |
| a7: | | D = 4 | T = 1 | |
| a8: | | D = 4 | | |
| a9: | S = 1 | | | |
| aa: | S = 1 | | | |
| ab: | | D = 5 | | |
| ac: | S = 1 | | | |
| ad: | | D = 4 | | |
| ae: | | D = 4 | | |
| af: | | | T = 1 | |
| b0: | | D = 3 | | |
| b1: | S = 1 | | | |
| b2: | | | T = 1 | |
| b3: | | D = 3 | | |
| b4: | S = 1 | | | |
| b5: | | D = 5 | | |
| b6: | | D = 3 | | |
| b9: | | D = 3 | | |
| ba: | | D = 2 | | |
| bb: | | | T = 1 | |
| bc: | | D = 3 | | |
| bd: | | | T = 1 | |
| c0: | | D = 1 | | |
| c2: | | D = 3 | | |
| c4: | | D = 2 | | Q = 1 |
| c5: | | | T = 1 | |
| c7: | | D = 3 | | Q = 1 |
| C8: | | D = 3 | | |
| C9: | | | T = 1 | |
| ca: | S = 1 | | | |
| cb: | | D = 5 | | |
| cc: | | | T = 1 | |
| cd: | | D = 3 | | |
| ce: | | D = 3 | | Q = 1 |
| cf: | S = 1 | | | |
| d0: | | D = 4 | | |
| d1: | | | T = 1 | |
| d2: | S = 1 | | | |
| d3: | | D = 4 | | |
| d4: | S = 1 | | | |
| d5: | | D = 5 | | |
| d6: | | D = 4 | | Q = 1 |
| d7: | S = 1 | | | |
| d8: | S = 1 | | | |
| d9: | | D = 4 | | |
| da: | | D = 5 | | |
| db: | S = 1 | | | |
| dc: | | D = 4 | | |
| dd: | S = 1 | | | |
| de: | | | T = 2 | |
| df: | | D = 4 | | |
| e0: | | D = 4 | | |
| e2: | S = 1 | | | |
| e3: | | D = 4 | | |
| e4: | S = 1 | | | |
| e5: | | D = 5 | | |
| e6: | | D = 4 | | |
| e7: | S = 1 | | | |
| e8: | S = 1 | | | |
| e9: | | D = 4 | | |
| ea: | | D = 5 | | |
| eb: | S = 1 | | | |
| ec: | | D = 4 | | |
| ed: | S = 1 | | | |
| ef: | | D = 4 | | |
| f0: | S = 1 | | | Q = 1 |
| f1: | | D = 3 | | |
| f2: | | D = 3 | | Q = 1 |
| f3: | | | T = 1 | |
| f4: | | D = 5 | | |
| f5: | S = 1 | | | |
| f6: | | | T = 2 | |
| f7: | | D = 3 | | |
| f8: | | D = 3 | | |
| f9: | | | T = 1 | |
| fb: | | D = 2 | | |
| fd: | | D = 3 | | |
| fe: | | | | Q = 1 |
| ff: | | | T = 2 | |

We claim:

1. A method of error correction and detection for data which is stored in a computer memory, comprising the steps of:

generating a error detection and correction set of store check bits for a data word by use of a selected error correction code which detects and corrects a single bit error and detects multiple bit errors in said data word, generating a store parity check bit for said data word, storing said data word, said store check bits and said store parity check bit in a computer memory, which comprises a plurality of multi-bit output memory devices, wherein multiple bits of said data word are stored in each of said memory devices and no more than one of said store check bits or store parity check bit is stored in any one of said memory devices, reading said data word, said store check bits and said store parity check bit from said computer memory, wherein there may be one or more bit errors in said data word, said store check bits and said store parity check bit read from said computer memory, generating an error detection and correction set of verify check bits for said data word, which was read from said computer memory, by use of said selected error correction code, generating a verify parity check bit for said data word read from said computer memory, comparing said store check bits read from said memory to said verify check bits to produce a check bit syndrome, comparing said store parity check bit read from said computer memory with said verify parity check bit to produce a parity syndrome, and decoding said check bit syndrome and said parity syndrome to:

(a) detect and identify single bit errors in said data word read from said computer memory, wherein a first output is produced, or (b) detect multiple bit errors which do not all occur within a single one of said memory devices, wherein a second output is produced, or (c) detect triple bit errors which all occur within the data bits within one of said memory devices, wherein a third output is produced, or (d) detect a check bit error, wherein a fourth output is produced.

2. A method of error correction and detection for data as recited in claim 1 wherein said data word has 32 bits, said set of store check bits has 7 bits within each of said memory devices can be stored a total of 4 bits and at least 3 of said 4 bits are data bits of said data word.

3. A method of error correction and detection for data as recited in claim 1 wherein said set of store check bits comprises a minimum number of bits for said data word for detecting and correcting a single bit error and detecting a double bit error.

4. A method for detecting failure of one of a plurality of memory devices in a computer memory wherein multiple bits of a data word are stored in each of a plurality of said memory devices, comprising the steps of:

generating a error detection and correction set of store check bits for a data word by use of a selected error correction code which detects and corrects a single bit error and detects multiple bit errors in said data word, generating a store parity check bit for said data word, storing said data word, said store check bits and said store parity check bit in a computer memory, which comprises a plurality of multi-bit output memory devices, wherein multiple bits of said data word are stored in each of said memory devices and no more than one of said store check bits or store parity check bit is stored in any one of said memory devices, reading said data word, said store check bits and said store parity check bit from said computer memory, wherein there may be one or more bit errors in said data word, said store check bits and said store parity check bit read from said computer memory, generating an error detection and correction set of verify check bits for said data word, which was read from said computer memory, by use of said selected error correction code, generating a verify parity check bit for said data word read from said computer memory, comparing said store check bits read from said memory to said verify check bits to produce a check bit syndrome, comparing said store parity check bit read from said computer memory with said verify parity check bit to produce a parity syndrome, and decoding said check bit syndrome and said parity syndrome to detect triple bit errors which all occur within the data bits within one of said memory devices, thereby indicating failure of one of said plurality of said memory devices in said computer memory.

5. A method of error correction and detection for data as recited in claim 4 wherein said data word has 32 bits, said set of store check bits has 7 bits, within each of said memory devices can be stored a total of 4 bits and at least 3 of said 4 bits are data bits of said data word.

6. A method of error correction and detection for data as recited in claim 4 wherein said set of store check bits comprises a minimum number of bits for said data word for detecting and correcting a single bit error and detecting a double bit error.

7. A method for storing data bits of a 32-bit data word and corresponding check bits for the data word in a computer memory which utilizes a plurality of multi-bit output memory devices for storing each data word, comprising:

storing 4 bits of said data word in a first 4-bit output memory device, storing 4 bits of said data word in a second 4-bit output memory device, storing 3 bits of said data word and 1 error correction and detection check bit in a third 4-bit output memory device, storing 3 bits of said data word and 1 error correction and detection check bit in a fourth 4-bit output memory device, storing 3 bits of said data word and 1 error correction and detection check bit in a fifth 4-bit output memory device, storing 3 bits of said data word and 1 error correction and detection check bit in a sixth 4-bit output memory device, storing 3 bits of said data word and 1 error correction and detection check bit in a seventh 4-bit output memory device, storing 3 bits of said data word and 1 error correction and detection check bit in a eighth 4-bit output memory device, storing 3 bits of said data word and 1 error correction and detection check bit in a ninth 4-bit output memory device, and storing 3 bits of said data word and a parity bit for said data word in a tenth 4-bit output memory device.

8. An error detection circuit for a computer memory in which a data word has multiple bits thereof stored in each of a plurality of memory devices together with a set of syndrome check bits and a parity check bit, for the stored data word, comprising:

a plurality of syndrome generators each connected to receive a separate subset of bits of said data word, which has been read from said memory devices of said computer memory, each of said syndrome generators generating a corresponding syndrome check bit, a parity generator circuit for generating a parity bit for said data word read from said computer memory, logic circuits connected to receive said stored syndrome check bits, which are read from said memory, and said generated syndrome check bits, for generating a syndrome at the outputs thereof, a logic circuit connected to receive said stored parity bit, which is read from said computer memory, and connected to receive said generated parity bit, for producing a parity syndrome bit therefrom, a decoder circuit connected to receive said syndrome, decode said syndrome and generate therefrom a logic signal on at least one of a plurality of output lines thereof, and and error generator circuit connected to said output lines of said decoder circuit for receiving said logic signal, connected to receive said syndrome and connected to receive said parity syndrome bit, for producing a plurality of error indication signals including a single bit error signal for indicating a single bit error in said data word, a multiple bit error signal for indicating a plurality of bit errors distributed across more than one of said memory devices in which said data word and check bits were stored and a triple bit error signal indicating at least three bit errors in one of said memory devices.

9. An error detection circuit for a computer memory as recited in claim 8 wherein each of said syndrome generator circuits is an exclusive OR gate and said logic circuits connected to receive said stored syndrome check bits are exclusive OR gates.

10. An error detection circuit for a computer memory as recited in claim 8 wherein said error generator circuit also generates a check bit error signal indicating the existence of a bit error in the check bits stored in said plurality of memory devices.

* * * * *